US012602363B1

(12) United States Patent (10) Patent No.: US 12,602,363 B1
Aluc (45) Date of Patent: Apr. 14, 2026

(54) OVERLAY BITMAPS FOR INDEXING AND QUERYING DATA

(71) Applicant: SAP SE, Walldorf (DE)

(72) Inventor: Gunes Aluc, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/955,741

(22) Filed: Nov. 21, 2024

(51) Int. Cl.
*G06F 16/22* (2019.01)

(52) U.S. Cl.
CPC ........ *G06F 16/2237* (2019.01); *G06F 16/221* (2019.01)

(58) Field of Classification Search
CPC ............................ G06F 16/2237; G06F 16/221
See application file for complete search history.

(56) References Cited

U.S. PATENT DOCUMENTS

| | | | | |
|---|---|---|---|---|
| 10,726,008 | B2 * | 7/2020 | Kirk | .................. G06F 16/24542 |
| 2018/0034824 | A1 * | 2/2018 | Maycotte | .............. H04L 63/102 |
| 2019/0294486 | A1 * | 9/2019 | Cheriton | ........... G06F 16/24558 |
| 2020/0218725 | A1 * | 7/2020 | Cheriton | ............. G06F 16/2458 |
| 2023/0418830 | A1 * | 12/2023 | Turner | ................ G06F 16/2237 |
| 2025/0200080 | A1 * | 6/2025 | Koc | ....................... G06F 40/263 |

* cited by examiner

*Primary Examiner* — Dangelino N Gortayo

(74) *Attorney, Agent, or Firm* — Fountainhead Law Group, PC

(57) ABSTRACT

Embodiments of the present disclosure include techniques for encoding data locations in a database using bit maps. In one embodiment, a plurality of bit maps are generated for unique values in a column of a table. The bit maps may be ordered in columns, where columns correspond to unique values a particular table column. Bit maps for each comprise a first binary value when table value in a corresponding row matches a corresponding bit map unique value. Bit map values are set to a second binary value opposite the first binary value when the bit map unique value does not match the table row value for previous bit maps and don't care values for subsequent bit maps. In one embodiment, the bit maps are ordered by bit density.

19 Claims, 9 Drawing Sheets

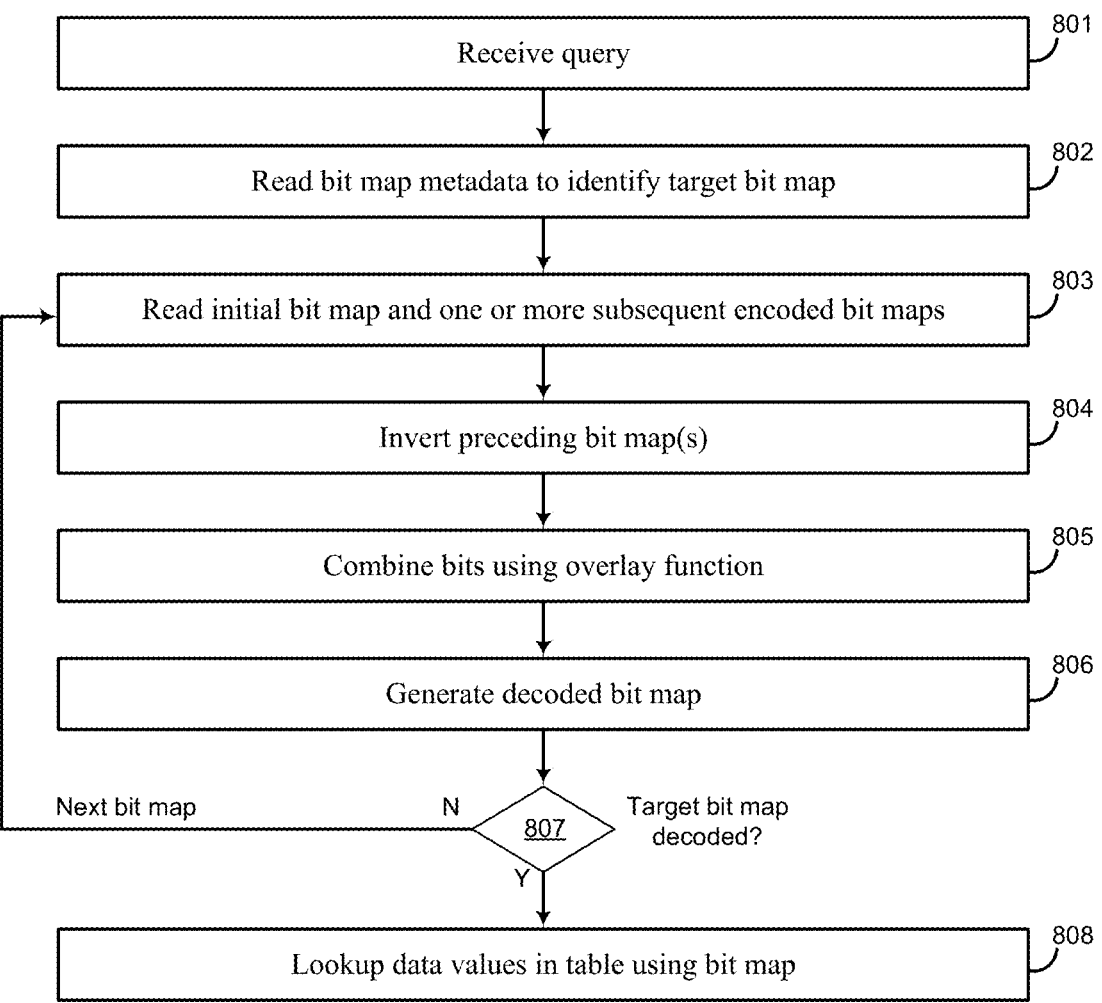
_Fig. 8_

OVERLAY BITMAPS FOR INDEXING AND QUERYING DATA

BACKGROUND

The present disclosure relates generally to computer software systems, and in particular, to overlay bitmaps for indexing and querying data.

Data are often stored in tables in a database. One example form of data are Open File Formats (OFFs). Open File Formats (OFFs) have revolutionized the way Big Data are queried and processed. Open file formats offer a combination of (i) the columnar representation, (ii) the Partition Attributes Across (PAX) layout, (iii) the dictionary-based encoding and (iv) lightweight indexes (e.g., zone maps, existence bitmaps and null bitmaps) to compress and query tabular data. Open File Formats form the building blocks of Open Table Formats (OTFs) and they have been successfully incorporated into the SPARK ecosystem as well as into many commercial database management systems.

While they offer numerous advantages, Open File Formats do not inherently support indexing beyond rudimentary data structures; therefore, in practice, one of three things typically happen: (i) in the SPARK ecosystem, complex queries over existing open file formats result in the unnecessary utilization of compute, and thus, monetary, resources; (ii) vendors offer proprietary solutions to efficiently execute complex queries, but because of their proprietary nature, consumers face the risk of a vendor lock-in which beats the purpose of an "open" format; (iii) data are indexed after being replicated in a database management system which leads to redundancy and/or issues with data freshness.

The following disclosure provides various solutions to technical problems associated with indexing and querying data in a database.

BRIEF DESCRIPTION OF THE DRAWINGS

FIG. 8 illustrates a method of querying data according to an embodiment.

DETAILED DESCRIPTION

Described herein are techniques for generating and decoding overlay bit maps. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Embodiments of the present disclosure include techniques for encoding data locations in a database using bit maps. In one embodiment, multiple bit maps are generated for the different unique values in a column (or portion of a column) of a table. The bit maps may be ordered, where every bit map in the ordered sequence represents a different unique value of the table column. The bit map for each unique value comprises a binary '1' value when the table value in a corresponding row matches a corresponding bit map unique value, and bit map values are set to don't care values for subsequent bit maps. Bit map values are set to a binary '0' value when the bit map unique value does not match the table row value for previous bit maps. In one embodiment, the bit maps are ordered by bit density. Bit maps may be generated and decoded to answer queries as set forth below.

Figure 1:
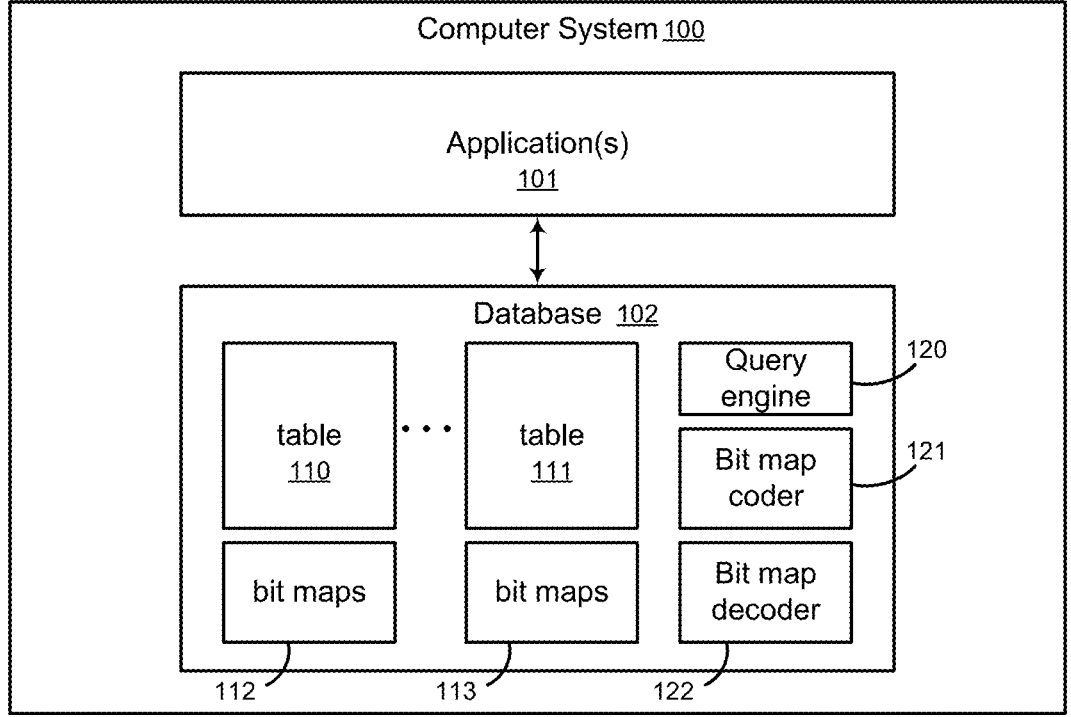
FIG. 1 illustrates a system according to an embodiment.

FIG. 1 illustrates a system according to an embodiment. Features and advantages of the present disclosure include generating and decoding overlay bit maps in a database 102 executing on a computer system 100. Computer system 100 may include, for example, one or more computers comprising one or more processors and a computer readable medium (memory) for executing software to perform the techniques described herein. In some example embodiments, one or more software applications 101 (herein, "Application(s)") may store and retrieve data from a database 102. Data may be stored in tables 110-111. Example forms of data include dimension data, such as names, labels, or other non-numeric data values. Embodiments of the present disclosure may include a bit map encoder 121 and bit map decoder 122. Bit map encoder may generate a bit map for data stored in tables 110-111. A bit map uses binary values (bits) to represent values of data in various locations of a table. For instance, as described in more detail below, data in a column of a table may be represented using a bit map. Here, table 110 is associated with bit maps 112 and table 111 is associated with bit maps 113. Accordingly, when a query for particular data values is received in a query engine 120 in database 102, the bit maps may be used to retrieve (look up) data values very quickly. A bit map may be accessed, decoded by bit map decoder 122, and the queried data retrieved from the appropriate database table.

Figure 2:
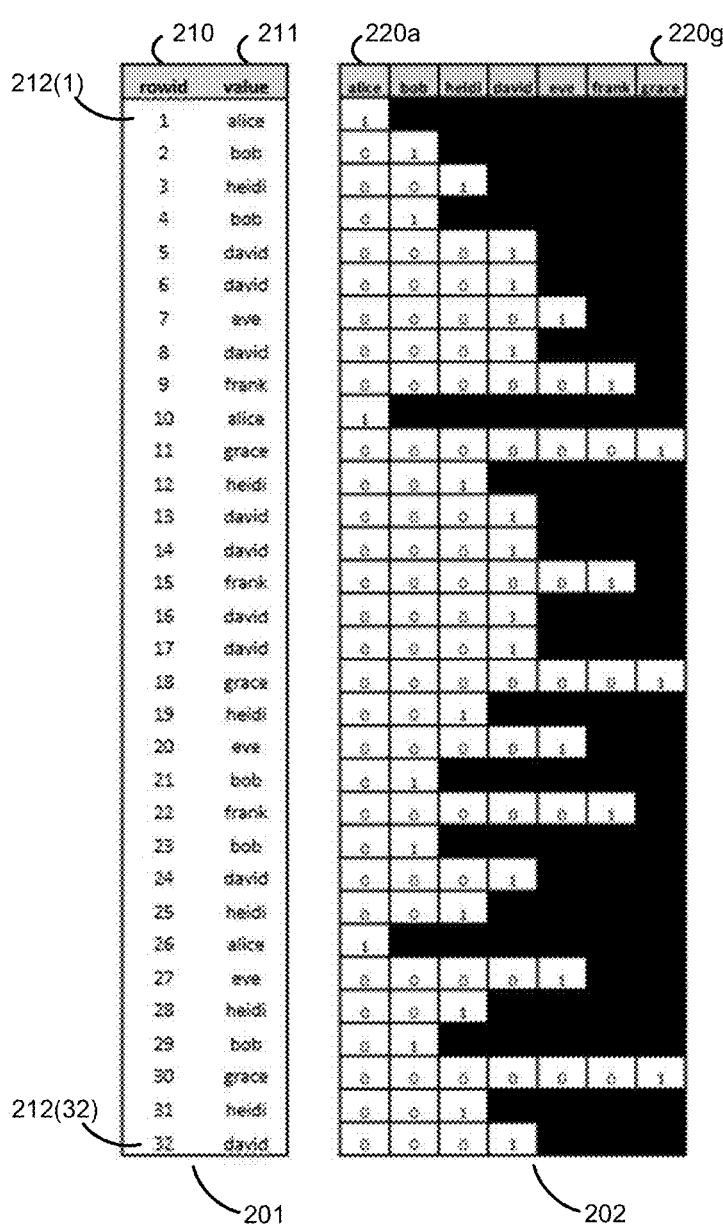
FIG. 2 illustrates bit maps according to an embodiment.

FIG. 2 illustrates generating bit maps according to an embodiment. This example illustrates one column of a row group 201 and a corresponding bit map according to an embodiment. In some embodiments, a table may be partitioned into one or more row groups comprising a number of rows. Here, the row group comprises 32 rows 212(1)-212(32) of a table. Column 211 of the row group may comprise values (e.g., dimensions) in each row. The column 211 for the row group may comprise a plurality of unique values.

Generating bit maps may comprise determining, for a particular column of each row group, a plurality of unique values. Here, the unique values found in column 211 are "alice," "bob," "heidi," "david," "eve," "frank," and "grace." Next bit map table 202 is formed. In this example, each unique value in column 211 forms a column of bit map table 202. Accordingly, there are 7 columns corresponding to each of the unique names in the rows of column 211 of table 201. Rows of the bit map table correspond to the number of rows of the row group. Thus, there are 32 rows in bit map table 202 and each row comprises 7 columns. Each row of bit map table 202 comprises a single binary value of '1' when the row of the particular column matches a corresponding bit map table column unique value. For example, the first row of bit map table 202 has a '1' value in the first row at the first column (the column designated for "alice") because the bit value table column unique value of the first column ("alice") matches the first row value in table 201 ("alice"). Similarly, the second row of bit map table 202 has a '1' value in the second row of the second column (the column designated for "bob") because the bit value table column unique value of the second column ("bob") matches the second row value in table 201 ("bob"). Likewise, the third row of bit map table 202 has a '1' value in the third row of the third column (the column designated for "heidi") because the bit value table column unique value of the third column ("heidi") matches the third row value in table 201 ("heidi"). It can be seen in FIG. 2 that each unique value in column 211 of table 201 has a corresponding '1' in a column in bit map table 202 where the value from a row of table 201 matches the unique value designated to column in the bit map table.

Advantageously, column values, for each row of the bit map table, up to the binary '1' value comprise a binary '0' value and column values after the binary '1' value comprise don't care (DC) values, which are represented here as blackout columns. Accordingly, each column of the bit map table 202 may form a bit map indicating the row in table 201 where a particular unique value may be found. Each bit map contains a '1' in a row where the row value in table 201 matches the column's designated unique value and a '0' in a row where the row does not match the column's designated unique value. While the present example illustrates one arrangement of bit map table columns and unique values, it is to be understood that different names may be associated with different columns. For example, any name could be associated with the first column, which would shift the columns and change the '0's and DCs in each column, but the '1's would be in the same positions of each column of the bit map table. In one embodiment, each column of values may have a bit density (e.g., number of '1' values versus the total number of values). For example, when there are more rows in table 201 having a particular unique value, the corresponding column of 1's and 0's in bit map table 202 will have more '1's and fewer '0's and thus a higher bit density. In some embodiments, the columns of the bit map table are ordered in decreasing bit density. As illustrated below, this may advantageously result in higher compression (e.g., resulting from more DC values).

Figures 3A, 3B:
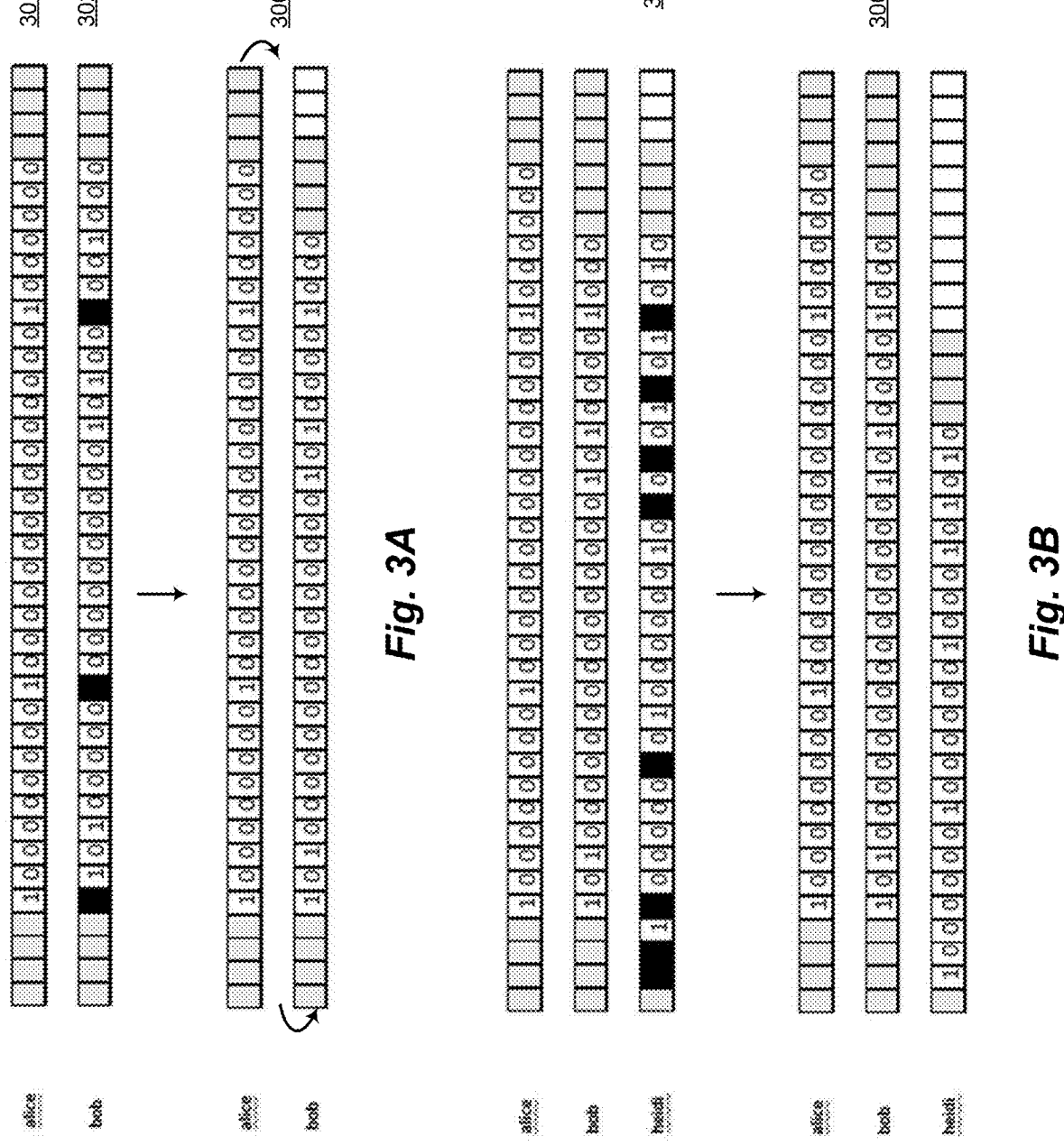
FIG. 3A illustrates an example of generating a bit map string according to an embodiment.
FIG. 3B illustrates another example of generating a bit map string according to an embodiment.

FIG. 3A illustrates an example of generating a bit map string according to an embodiment. Encoding data may include forming a bit map string from multiple bit maps. Two bit maps 301 and 302 are shown in FIG. 3A. Bit map 301 corresponds to the bit map for the first column ("alice") and bit map 302 corresponds to the bit map for the second column ("bob") from bit map table 202 in FIG. 2. A bit map string comprises successive columns of the bit map table (where columns are individual bit maps). A bit map string comprises the binary '0' and '1' values, but advantageously, not the don't care values, from each column, thereby reducing the number of bits in the bit map string for all columns of the bit map table. In some embodiments, each bit map may comprise associated metadata. In this example, each bit map comprises four (4) header bits in front of the bit map and four (4) footer bits at the end of the bit map. The metadata may comprise a binary code uniquely representing one of the unique values. As discussed further below, a query may first access the binary code in the head to find a value, and then decode the bit maps to find locations (e.g., rows) in the database where the values are stored. In some example embodiments, the metadata may comprise the value the bitmap represents, the number of physical bytes the bitmap occupies, the number of logical bits the bit occupies, and a run-length used in the encoding of the bitmap, if applicable.

Bit map string 300a comprises the first bit map ("alice") in the first column followed by the second bit map ("bob") in the second column separated by the footer of bit map 301 and header of bit map 302. When the bit map string 300a is formed, the don't care values are removed, thus reducing the size of the bit map string.

FIG. 3B illustrates another example of generating a bit map string according to an embodiment. In this example, the third column 303 of the bit map table ("heidi") is appended to the bit map string 300a with the don't care values removed. The result is bit map string 300b. Additional columns from the bit map table may be successively combined from the first column to the last column of the bit map table to produce a bit map string.

Figures 4A, 4B:
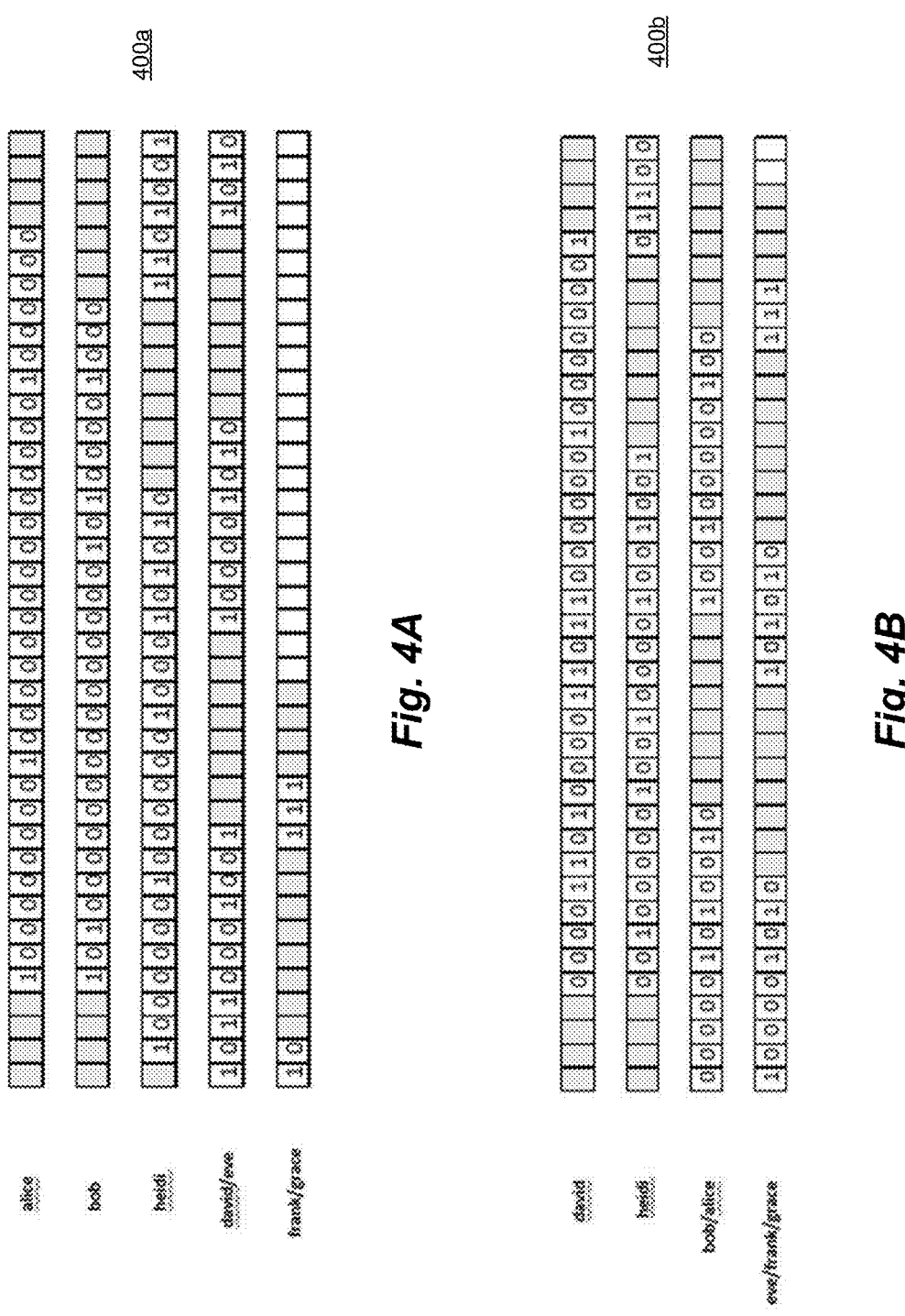
FIG. 4A illustrates an example bit map string according to an embodiment.
FIG. 4B illustrates another example bit map string according to an embodiment.

FIG. 4A illustrates an example bit map string according to an embodiment. This example illustrates converting all the bit map columns of the bit map table into a bit map string 400a.

FIG. 4B illustrates another example bit map string according to an embodiment. As mentioned above, bit maps of the bit map table may be ordered according to bit map density. This example illustrates the resulting bit map string 400b when the bit map columns are arranged in decreasing order of bit map density (e.g., the first column in the bit map table has the most unique values in the row group, the second column in the bit map table has the second most unique values in the row group, and so on). This increases the number of don't care values, which results in a lower number of bits in the bit map string.

Figure 5:
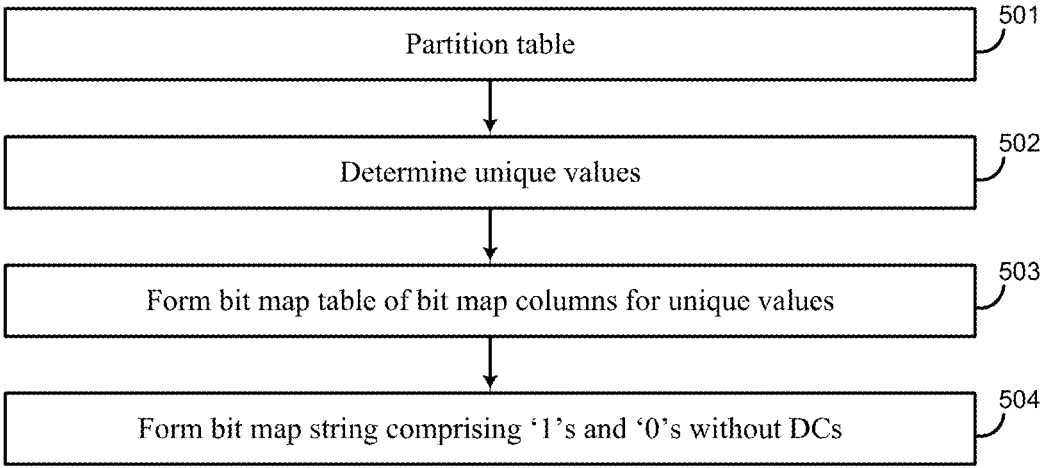
FIG. 5 illustrates a method according to an embodiment.

FIG. 5 illustrates a method according to an embodiment. At 501, a table is partitioned into one or more row groups comprising a number of rows. At 502, the system determines, for a particular column of each row group, a plurality of unique values. At 503, the system forms a bit map table comprising bit map columns corresponding to each unique value and bit map rows corresponding to the number of rows of the row group. The columns of the bit map table correspond to unique values in rows of the particular column, and rows of the bit map table comprise one first binary value (e.g., a '1') when a row of the particular column matches a corresponding bit map table column unique value. Column values, for each row of the bit map table, up to the first binary value comprise a second binary value opposite the first binary value (e.g., '0') and column values after the first binary value comprise don't care values. In some embodiments, the columns of the bit map table are ordered according to decreasing bit density from a first column to a last column, for example. At 504, the system forms a bit map string comprising successive columns of the bit map table. The bit map string comprising the first and second binary values, but not the don't care values, from each column. In some embodiments, the bit maps may be further compressed. For example, given that these bitmaps are very sparse, further compression is possible using run-length encoding. As mentioned above, the run-length may be stored in the metadata, for example.

Figure 6:
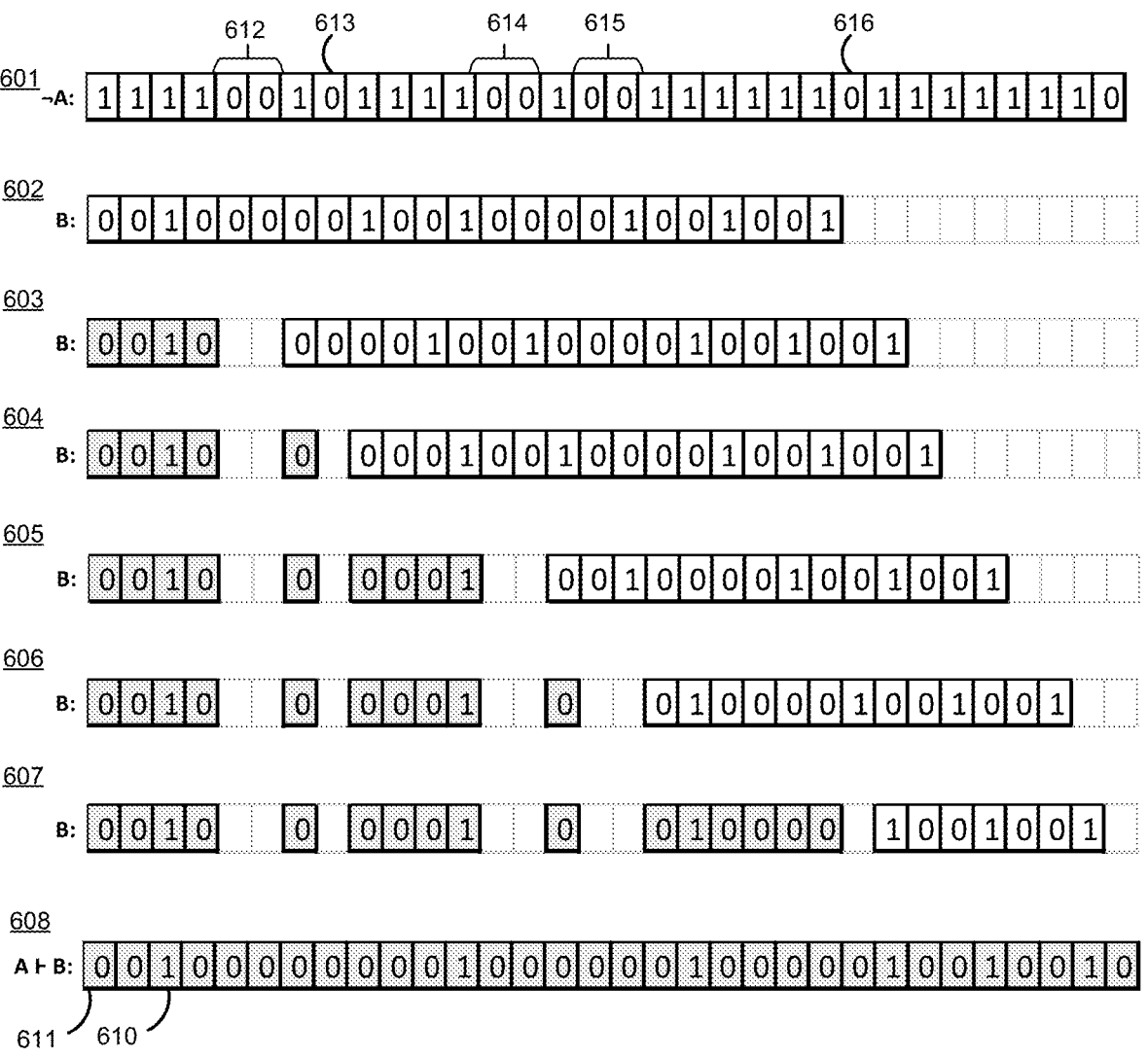
FIG. 6 illustrates decoding bit maps according to an embodiment.

FIG. 6 illustrates decoding bit maps according to an embodiment. FIG. 6 shows an inverted bit map 601 corresponding to "david" table values, which is the inverted initial bit map when the bit maps are sorted according to bit density in the example above, and a subsequent bit map 602 corresponding to "heidi" for multiple steps of the decoding process. Since each proceeding bit map results in don't care values for the next subsequent bit map, each bit map is decoded successively (e.g., starting with the initial bit map for "david" and the subsequent bit map for "heidi"). In this example, the decoding is according to decreasing bit density order, and each decoded bit map is used to decode a subsequent encoded bit map.

In this example, decoding comprises identifying bit maps in the bit map string. The bit map string comprises bit maps separated by headers and footers, and the bit maps are in a particular order (e.g., illustrated in the bit map table from left, or initial, to right, or final). The bits of the inverted bit map are combined with bits of one or more subsequent encoded bit maps to produce a decoded bit map. In this example, the initial bit map is identified and inverted as illustrated at 601, which is the inverted bit map for "david," and the subsequent bit map is identified (here, bit map 602 for "heidi"). Bits are then combined bit by bit as illustrated at 603-608, where the subsequent bit map 602 is shown in multiple different states during the process for illustrative purposes. Features and advantages of the present disclosure include combining bits using an overlay function. For the overlay function, combining bits is performed as follows. When a bit of the inverted bit map is I and bits of the one or more subsequent encoded bit maps are 1, a bit of the decoded bit map is 1, which is illustrated at 610. Similarly, when the bit of the inverted first bit map is 1 and a bit of one of the one or more subsequent bit maps is 0, the bit of the decoded bit map is 0, as illustrated at 611. However, when a bit of an inverted previous bit map is 0, the remaining values of the one or more subsequent bit maps are shifted by one and the bit of the decoded bit map is 0. In this example, the previous bit map and is the inverted bit map 601 and there is one subsequent bit map 602. Bit map 602 is shifted by 2 places due to the '0' values at 612 as illustrated at 603, with '0' values being inserted into the decoded bit map 608. Similarly, a '0' value at 613 results in a shift of bit map 602 at 604, '00' at 614 results in a shift at 605, '00' at 615 results in a shift at 606, and '0' at 616 results in a shift at 607. After each shift, the next bit of the inverted bit map 601 is combined with the next bit of the shifted bit map to produce a result bit in the decoded bit map 608.

Figure 7:
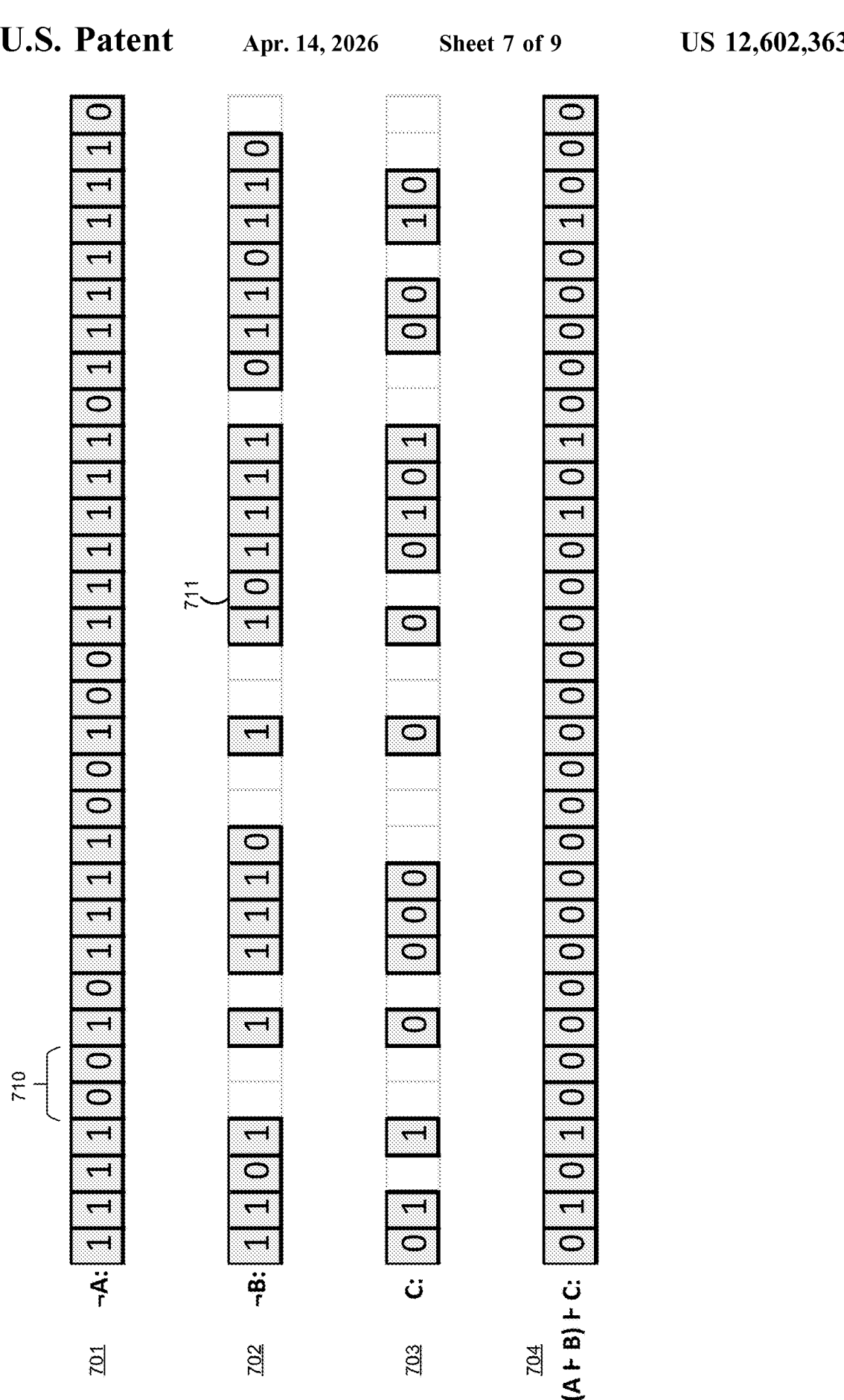
FIG. 7 illustrates decoding bit maps according to another embodiment.

FIG. 7 illustrates decoding bit maps according to another embodiment. In other embodiments, a preceding bit map may be combined with multiple subsequent bit maps. FIG. 7 shows a "Ternary" combination (e.g., 3 successive bit maps), but it is to be understood that more bit maps may be combined using the present techniques. In this example, the preceding and first subsequent bit map are inverted to produce bit maps 701 and 702. Bit maps 701, 702, and 703 are then combined using the above described overlay operation to produce decoded bit map 704. In this case, a '0' value in bit map 701 causes both subsequent bit maps to be shifted (e.g., at 710). Likewise, a '0' value in bit map 702 causes bit map 703 to be shifted. The decoded bit map is shown at 704.

FIG. 8 illustrates a method of querying data according to an embodiment. As mentioned above, the present techniques may be used to quickly and efficiently query data in a database. For example, a database may receive the following query at 801, which includes a target value of "bob":

SELECT *
FROM myTable
WHERE myColumn="bob"

At 802, the bit map metadata is read to identify the target bit map (here, "bob"). At 803, the initial bit map is read with one or more subsequent bit maps in the bit map string. Decoding may use an initial bit map and one or more subsequent encoded bit maps. At 804, one or more bit maps preceding a last subsequent bit map are inverted. At 805, bits are combined using the overlay function described above. At 806, a decoded bit map is generated. If the decoded bit map is not the target bit map, the process may be repeated for the next bit map. If the target bit map is decoded, the target bit map may be used to perform a lookup to find the rows of a table having the target value. Referring to the bit map table 202 in FIG. 2, the decoded target bit map may be the values in the column for "bob," where the don't care values are replaced with '0' values. The rows of the table including the values of "bob" correspond to the positions of the decoded target bit map having values of '1'.

Figure 9:
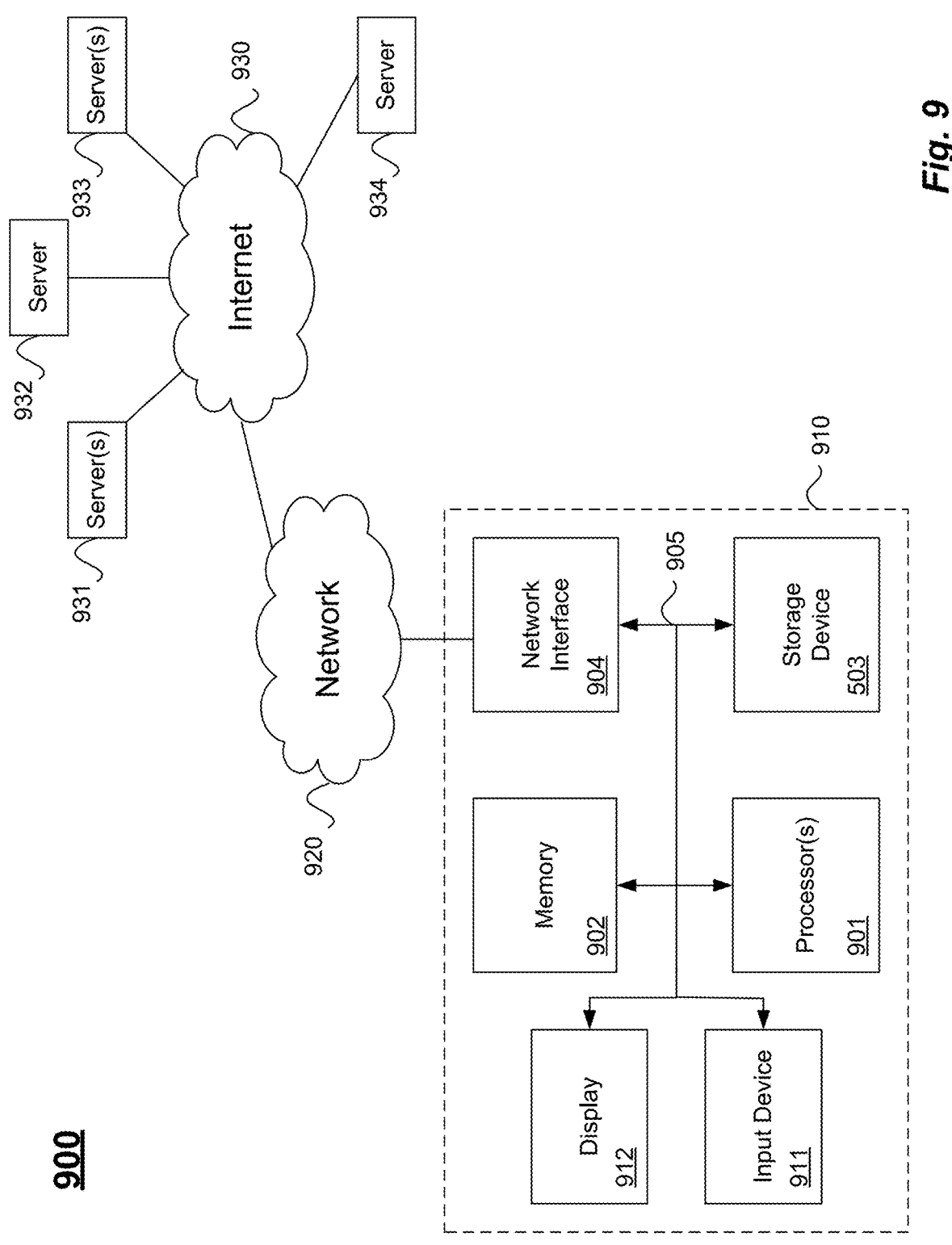
FIG. 9 illustrates hardware of a special purpose computing system configured according to the above disclosure.

FIG. 9 illustrates hardware of a special purpose computing system 900 configured according to the above disclosure. The following hardware description is merely one example. It is to be understood that a variety of computers topologies may be used to implement the above-described techniques. An example computer system 910 is illustrated in FIG. 9. Computer system 910 includes a bus 905 or other communication mechanism for communicating information, and one or more processor(s) 901 coupled with bus 905 for processing information. Computer system 910 also includes memory 902 coupled to bus 905 for storing information and instructions to be executed by processor 901, including information and instructions for performing some of the techniques described above, for example. Memory 902 may also be used for storing programs executed by processor(s) 901. Possible implementations of memory 902 may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 903 may include source code, binary code, or software files for performing the techniques above, for example. Storage device 903 and memory 902 are both examples of non-transitory computer readable storage mediums (aka, storage media).

In some systems, computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses for coupling various components of the computer together, for example.

Computer system 910 also includes a network interface 904 coupled with bus 905.

Network interface 904 may provide two-way data communication between computer system 910 and a local network 920. Network 920 may represent one or multiple networking technologies, such as Ethernet, local wireless networks (e.g., WiFi), or cellular networks, for example. The network interface 904 may be a wireless or wired connection, for example. Computer system 910 can send and receive information through the network interface 904 across a wired or wireless local area network, an Intranet, or a cellular network to the Internet 930, for example. In some embodiments, a frontend (e.g., a browser), for example, may access data and features on backend software systems that may reside on multiple different hardware servers on-prem 931 or across the network 930 (e.g., an Extranet or the Internet) on servers 932-934. One or more of servers 932-934 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform methods as described herein and in the following examples. In another embodiment, the present disclosure includes a non-transitory computer-readable medium storing computer-executable instructions that, when executed by at least one processor, perform the methods as described herein and in the following examples.

In one embodiment, the present disclosure includes a computer implemented method comprising: partitioning a table into one or more row groups comprising a number of rows; determining, for a particular column of each row group, a plurality of unique values; forming a a plurality of bit maps (e.g., in a bit map table) comprising bit map values (e.g., in columns) corresponding to each unique value and bit map values (e.g., rows) in each bit map corresponding to the number of rows of the row group, wherein columns of the bit maps correspond to unique values in rows of the particular column, wherein values of the bit maps comprise one first binary value when a row of the particular column matches a corresponding bit map unique value, and wherein values (e.g., for each row of the bit map table) in corresponding locations across the bit maps up to the first binary value comprise a second binary value opposite the first binary value and after the first binary value comprise don't care values; and forming a bit map string comprising successive bit maps (e.g., columns of the bit map table), the bit map string comprising the first and second binary values, but not the don't care values, from each column.

In one embodiment, each column of the bit map table corresponds to a different bit map.

In one embodiment, each bit map comprises associated metadata.

In one embodiment, the metadata comprises a binary code uniquely representing the one of the unique values.

In one embodiment, the metadata comprises header bits in front of the bit map and footer bits at the end of the bit map.

In one embodiment, the columns of the bit map table are ordered according to decreasing bit density from a first column to a last column.

In one embodiment, the method further comprising successively decoding each bit map, wherein each decoded bit map is used to decode a subsequent encoded bit map.

In one embodiment, said decoding is according to decreasing bit density order.

In one embodiment, successively decoding comprises combining bits of an inverted first bit map with bits of one or more subsequent encoded bit maps to produce a decoded bit map.

In one embodiment, combining bits uses an overlay function.

In one embodiment, combining bits comprises: when a bit of the inverted first bit map is 1 and bits of the one or more subsequent encoded bit maps are 1, a bit of the decoded bit map is 1; when the bit of the inverted first bit map is 1 and a bit of one of the one or more subsequent bit maps is 0, the bit of the decoded bit map is 0; and when a bit of an inverted previous bit map is 0, the remaining values of the one or more subsequent bit maps are shifted by one and the bit of the decoded bit map is 0.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A computer implemented method comprising:

partitioning a table into one or more row groups comprising a number of rows;

determining, for a particular column of each row group, a plurality of unique values;

forming a bit map table comprising bit map columns corresponding to each unique value and bit map rows corresponding to the number of rows of the row group, wherein columns of the bit map table correspond to unique values in rows of the particular column, wherein rows of the bit map table comprise one first binary value when a row of the particular column matches a corresponding bit map table column unique value, and wherein column values, for each row of the bit map table, up to the first binary value comprise a second binary value opposite the first binary value and after the first binary value comprise don't care values;

forming a bit map string comprising successive columns of the bit map table, the bit map string comprising the first and second binary values, but not the don't care values, from each column; and successively decoding each bit map, wherein each decoded bit map is used to decode a subsequent encoded bit map.

2. The method of claim 1, wherein each column of the bit map table corresponds to a different bit map.

3. The method of claim 2, wherein each bit map comprises associated metadata.

4. The method of claim 3, wherein the metadata comprises a binary code uniquely representing the one of the unique values.

5. The method of claim 3, wherein the metadata comprises header bits in front of the bit map and footer bits at the end of the bit map.

6. The method of claim 1, wherein the columns of the bit map table are ordered according to decreasing bit density from a first column to a last column.

7. The method of claim 1, wherein said decoding is according to decreasing bit density order.

8. The method of claim 1, wherein successively decoding comprises combining bits of an inverted first bit map with bits of one or more subsequent encoded bit maps to produce a decoded bit map.

9. The method of claim 8, wherein combining bits uses an overlay function.

10. The method of claim 8, wherein combining bits comprises:

when a bit of the inverted first bit map is 1 and bits of the one or more subsequent encoded bit maps are 1, a bit of the decoded bit map is 1;

when the bit of the inverted first bit map is 1 and a bit of one of the one or more subsequent bit maps is 0, the bit of the decoded bit map is 0; and when a bit of an inverted previous bit map is 0, the remaining values of the one or more subsequent bit maps are shifted by one and the bit of the decoded bit map is 0.

11. A computer system comprising:

at least one processor;

at least one non-transitory computer-readable medium storing computer-executable instructions that, when executed by the at least one processor, cause the computer system to execute a method comprising:

partitioning a table into one or more row groups comprising a number of rows;

determining, for a particular column of each row group, a plurality of unique values;

forming a bit map table comprising bit map columns corresponding to each unique value and bit map rows corresponding to the number of rows of the row group, wherein columns of the bit map table correspond to unique values in rows of the particular column, wherein rows of the bit map table comprise one first binary value when a row of the particular column matches a corresponding bit map table column unique value, and wherein column values, for each row of the bit map table, up to the first binary value comprise a second binary value opposite the first binary value and after the first binary value comprise don't care values; and forming a bit map string comprising successive columns of the bit map table, the bit map string comprising the first and second binary values, but not the don't care values, from each column; and successively decoding each bit map, wherein each decoded bit map is used to decode a subsequent encoded bit map.

12. The computer system of claim 11, wherein each column of the bit map table corresponds to a different bit map.

13. The computer system of claim 12, wherein each bit map comprises associated metadata.

14. The computer system of claim 13, wherein the metadata comprises a binary code uniquely representing the one of the unique values.

15. The computer system of claim 11, wherein successively decoding comprises successively decoding each bit map according to decreasing bit density order.

16. A non-transitory computer-readable medium storing computer-executable instructions that, when executed by at least one processor of a computer system, cause the computer system to execute method comprising:

partitioning a table into one or more row groups comprising a number of rows;

determining, for a particular column of each row group, a plurality of unique values;

forming a bit map table comprising bit map columns corresponding to each unique value and bit map rows corresponding to the number of rows of the row group, wherein columns of the bit map table correspond to unique values in rows of the particular column, wherein rows of the bit map table comprise one first binary value when a row of the particular column matches a corresponding bit map table column unique value, and wherein column values, for each row of the bit map table, up to the first binary value comprise a second binary value opposite the first binary value and after the first binary value comprise don't care values; and forming a bit map string comprising successive columns of the bit map table, the bit map string comprising the first and second binary values, but not the don't care values, from each column; and successively decoding each bit map, wherein each decoded bit map is used to decode a subsequent encoded bit map.

17. The non-transitory computer-readable medium of claim 16, wherein successively decoding comprises combining bits of an inverted first bit map with bits of one or more subsequent encoded bit maps to produce a decoded bit map.

18. The non-transitory computer-readable medium of claim 16, wherein each column of the bit map table corresponds to a different bit map.

19. The non-transitory computer-readable medium of claim 16, wherein the columns of the bit map table are ordered according to decreasing bit density from a first column to a last column.

*    *    *    *    *